United States Patent [19]

Curtis

[11] Patent Number: 5,339,307
[45] Date of Patent: Aug. 16, 1994

[54] DATA COMMUNICATION SYSTEM WITH A LOCAL NETWORK INTERFACE

[75] Inventor: Robert A. Curtis, Hudson, Mass.

[73] Assignee: Digital Equipment Corporation, Maynard, Mass.

[21] Appl. No.: 52,808

[22] Filed: Apr. 23, 1993

Related U.S. Application Data

[63] Continuation of Ser. No. 724,564, Jun. 28, 1991, abandoned.

[51] Int. Cl.[5] .................... H04J 3/02; H04L 25/40
[52] U.S. Cl. .................... 370/13.1; 370/85.3; 370/85.9; 370/97; 375/3; 375/7; 178/73
[58] Field of Search .................... 370/13, 13.1, 60, 67, 370/85.1, 85.2, 86.3, 85.9, 85.11, 94.1, 97; 375/3, 3.1, 4, 7; 340/825.06, 825.5, 825.51; 178/70 R, 71 R, 73, 71 B

[56] References Cited

U.S. PATENT DOCUMENTS

| | | | |
|---|---|---|---|
| 4,063,220 | 12/1977 | Metcalfe et al. | 340/147 |
| 4,099,024 | 7/1978 | Boggs et al. | 370/85.2 |
| 4,481,626 | 11/1984 | Boggs et al. | 370/85.3 |
| 4,550,402 | 10/1985 | Gable et al. | 370/85.11 |
| 4,569,045 | 2/1986 | Schieble et al. | 370/85.9 |
| 4,646,361 | 2/1987 | Usui | 370/85.2 |
| 4,656,627 | 4/1987 | Hasley et al. | 370/85.11 |
| 4,700,342 | 10/1987 | Egami | 370/85.2 |
| 4,701,909 | 10/1987 | Kavehrad et al. | 370/85.3 |
| 4,751,701 | 6/1988 | Roos et al. | 370/85.3 |
| 4,797,901 | 1/1989 | Goerne et al. | 370/94.1 |
| 4,825,435 | 4/1989 | Amundsen et al. | 370/85.1 |
| 4,901,348 | 2/1990 | Nichols et al. | 370/60 |
| 4,959,829 | 9/1990 | Griesing | 370/85.3 |
| 5,012,467 | 4/1991 | Crane | 370/85.3 |
| 5,079,766 | 1/1992 | Richard et al. | 370/85.3 |

*Primary Examiner*—Alpus H. Hsu
*Attorney, Agent, or Firm*—David A. Dagg; A. Sidney Johnston; Albert P. Cefalo

[57] ABSTRACT

A data communication system having a plurality of nodes is disclosed. A number of transceivers is provided, each transceiver being coupled to a respective one of the plurality of nodes, for data communication between the transceiver and its associated node. Each transceiver is also provided with a controlled current source. The data communication system is also equipped with a data bus for communication of a transmitted data signal between the transceivers. A current bus which is coupled to each transceiver receives a current signal from the controlled current source when a transceiver is placing the data onto the data bus.

12 Claims, 6 Drawing Sheets

PRIOR ART

DATA COMMUNICATION SYSTEM WITH A LOCAL NETWORK INTERFACE

This application is a continuation of Ser. No. 07/724,564, filed Jun. 28, 1991, now abandoned.

FIELD OF THE INVENTION

The invention relates to data communication systems, and in particular, to networks having a local network interface.

BACKGROUND OF THE INVENTION

Multiple computers are often linked together into a computer network in order to communicate data and share computer memory and processing resources among several computers. In a typical network architecture, such as the ethernet network, the computers, referred to as nodes, are connected by means of a shared network communication bus in the form of an electrically conducting cable. The network communication bus may be accessed by any node attached to it in order to receive data from and transmit data to other nodes in the network.

Each node is connected to the network communication bus through a transceiver which converts digital data received from the computer as a binary number sequence into a binary level voltage signal in accordance with a selected code, such as the Manchester code. The transceiver also converts the binary level voltage signal from the network communication bus into a binary number sequence which is supplied to the computer.

Each transceiver communicates data to and from the network communication bus in the form of data packets of predefined length. Prior to transmission of a data packet, the transceiver generates a preamble signal, having a recognizable bit pattern, which is supplied to the network communication bus and to be detected by all the other nodes in the network. A data packet is then transmitted after the preamble signal which typically includes a destination address, a source address, protocol type, data and data checking sections. The destination address identifies the receiving node to which the communicated packet is addressed while the source address indicates the originating or transmitting node. Consequently, even though each node in the network detects that a data packet has been transmitted, only the node whose address matches the destination address in the transmitted packet, receives it. The protocol type information is required by the receiving node to properly interpret the contents of the data packet. The data section, containing the data to be communicated, may vary in length between a minimum and a maximum number of bits, according to the selected protocol. Finally, the data checking section of the packet contains the error detecting and/or correcting code. This code may, for example, be a cyclical redundancy code (CRC) which is derived from a modulo 2 division of the data in the data packet by a selected polynomial, known as a generator polynomial. The CRC, which is appended at the end of the data, is needed to perform error detection of the received data at the destination node.

In normal operation, all nodes in the network may attempt data transmission at any time. It is thus possible that two or more nodes may initiate transmission simultaneously. This condition, known as collision, requires that the data packets which appear on the network communication bus during the collision period be invalidated until all the nodes involved in the collision stop transmission. In order to accomplish this, a node which first detects the collision transmits a signal, known as a jam signal, to its transceiver in the form of a predetermined jam bit pattern. The transceiver converts the jam bit pattern into a data invalid signal which is supplied to the network communication bus. When a jam signal is received by a transceiver, it is passed to its associated node.

When a jam signal is recognized by the nodes in the network, each transmitting node aborts its transmission and enters into a collision wait state of random duration before attempting to transmit again.

Several nodes may be connected together by use of a local network interface to form a local network segment. The local network interface provides each node in the local network segment with access to both a local shared communication medium and a connection to the network communication bus. The use of a local network interface is desirable whenever the nodes in the local network segment communicate heavily among themselves but may also transmit data to and receive data from other nodes in the network.

Figure 1:
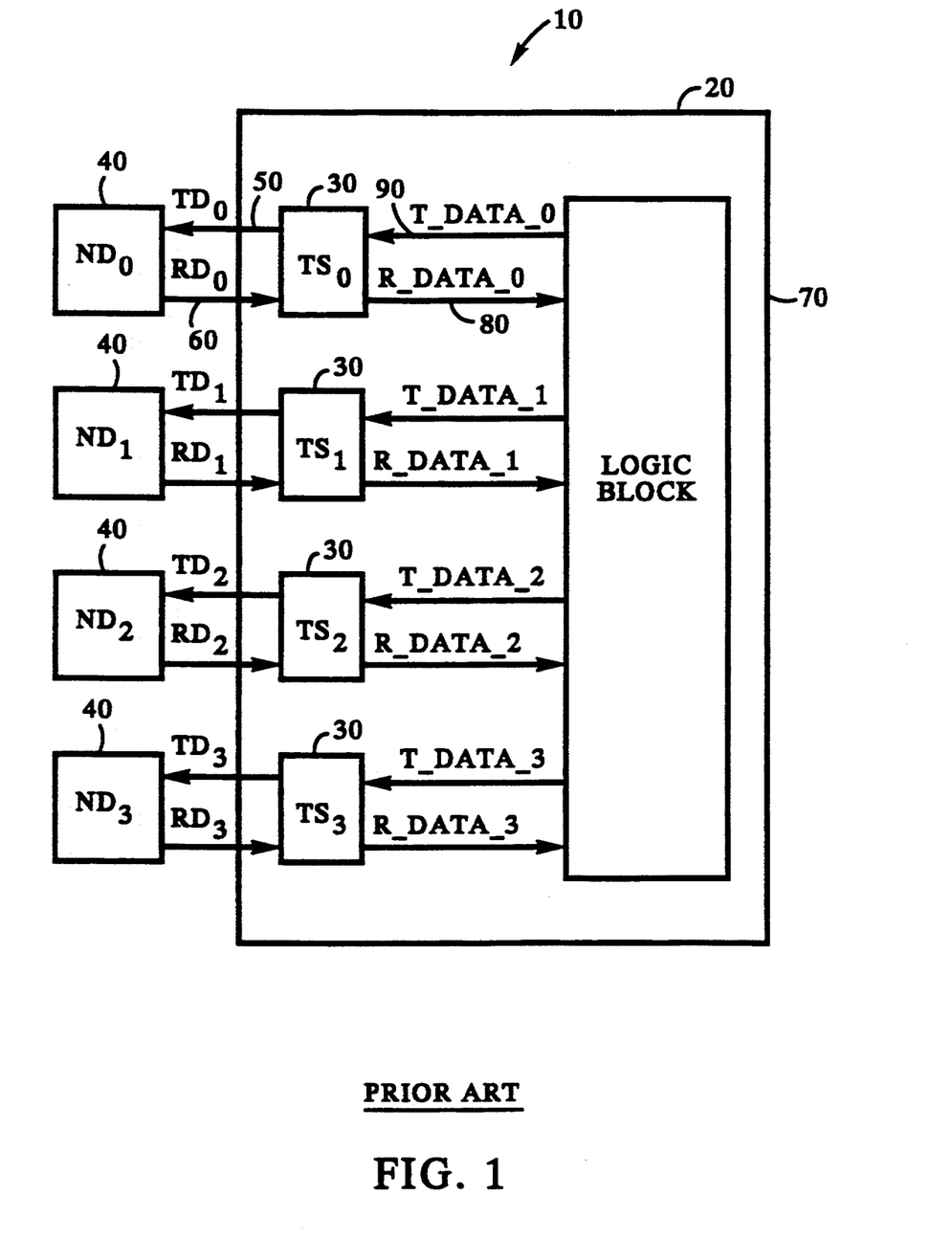
FIG. 1 is a block diagram illustrating a prior art data communication system with a local network interface.

FIG. 1 shows the architecture of a local network segment 10. In FIG. 1 each line may represent one or more physical connections, such as separate cables for data transmission and reception, data enabled status signals, and jam signal communication. Each local network segment 10 includes, by way of example, four nodes 40 denoted as ND0 through ND3 and a local network interface 20. Local network interface 20 includes four transceivers 30 (denoted TS0 through TS3, respectively) corresponding to nodes ND0 through ND3, and a logical block 70. A first output terminal of each of transceivers 30 is coupled to an input terminal of the corresponding one of nodes 40 via data transmitted lines 50. An output terminal of each of nodes 40 is coupled to respective first input terminals of transceivers 30 via data received lines 60. A second output terminal of each of transceivers 30 is coupled to respective input terminals of logic block 70 via lines 80. Respective output terminals of logic block 70 are coupled to second input terminals of transceivers 30 via lines 90. When used below, the terms received and transmitted refer to data communications from the viewpoint of the local network segment.

In operation, node ND0 may transmit data to the local network segment by delivering a data packet in the form of a binary data received sequence, such as RD0, to its associated transceiver TS0, via line 60. The transceiver 30 transforms the data received sequence RD0 into a corresponding data received voltage signal R_DATA_0 which is supplied to logic block 70 via 80. Logic block 70 retransmits the data received voltage signal R_DATA_0 via a local shared communication medium such as a data bus (not shown) to the transceivers TS1 through TS3 associated with the remaining three nodes ND1 through ND3. The data transmitted voltage signals T_DATA_1 through T_DATA_3 are converted by the respective transceivers TS1 through TS3 into the data transmitted sequences TD1 through TD3, respectively. While each node ND1 through ND3 detects the data packet in the form of the corresponding data transmitted sequence TD1 through TD3, only the node whose address matches the destination address of the data packet, processes the data packet further, in accordance with the protocol designated in the packet.

In addition to controlling transmission and reception of the data packets between the nodes in the local network segment, logic block 70 ensures that only one node is involved in transmission at a time. To accomplish this, logic block 70 arbitrates the data packet flow from all the nodes in accordance with a set of logical relations. The logical relations, which represent the data flow control logic, may be implemented inside logic block 70 as a gate array (not shown) configured to allow data packet transmission only if a single node is transmitting and to invalidate the transmitted data if a collision is detected. For example, if only two nodes, such as the nodes ND0 and ND1, are connected to local network interface 20, the logical equations that must hold for successful transmission from the node ND0 to the node ND1 are:

$$TD1 = \overline{COL} \text{ AND } R\_DATA\_0 \qquad (1)$$

where TD1 represents the data transmitted sequence supplied to the transceiver TS1 to the respective node ND1 and COL represents the state of collision with both node ND0 and ND1 attempting transmission simultaneously:

$$COL = \overline{(\overline{RD0} \text{ AND } RD1 \text{ OR } RD0 \text{ AND } \overline{RD1} \text{ OR } RD0 \text{ AND } RD1)} \qquad (2)$$

and where RDi ( i=0, . . . , 3 ) represent the data received sequences sent by the nodes ND0 through ND3 to their respective transceivers TS0 through TS3. The overbar denotes the logical complement.

If a third node, for example, node ND2 is connected to the local network interface 20, equations (1) and (2) become $$TD1 = \overline{COL} \text{ AND } (R\_DATA\_0 \text{ OR } R\_DATA\_2) \qquad (3)$$

$$COL = \overline{(\overline{RD0} \text{ AND } RD1 \text{ AND } RD2 \text{ OR } RD0 \text{ AND } \overline{RD1} \text{ AND } RD2 \text{ OR } RD0 \text{ AND } RD1 \text{ AND } \overline{RD2} \text{ OR } RD0 \text{ AND } RD1 \text{ AND } RD2)} \qquad (4)$$

It is evident from equations (1)–(4) that the addition of new nodes to the local network segment 10 requires that substantial, and increasingly more complex, modifications be made to the data flow control logic inside logic block 70. Because each node 40 must be notified that a collision has occurred, typical implementations of local network interface 20 require that logic block 70 be supplied with separate data received, data transmitted, and collision detected signal terminals for each transceiver connection. Furthermore, the logic expansion required by the addition of new nodes 40 to local network interface 20 may exceed the capacity of the gate array in the logic block 70. Other known implementations multiplex the data received voltage lines, such as T_DATA_0 through T_DATA_3, by means of a decoder (not shown) to allow data packet transmission to each transceiver 30. In either event, the necessary hardware changes limit the addition of new nodes and make the process of expanding the local network segment 10 very costly.

It is thus desirable to provide a local network interface that would permit addition of new nodes to the local network segment 10 with the least possible modification of the transceiver connections and data flow control logic.

SUMMARY OF THE INVENTION

The invention is a data processing system having a plurality of nodes and respectively coupled to a corresponding plurality of transceivers for data communication between the transceiver and the associated node. The data processing system is also provided with a data bus coupled to the plurality of the transceivers for communication of a data signal between the transceivers. A current bus, which is coupled to each transceiver, is provided for carrying a current signal for receipt by each transceiver in the system. Each transceiver inserts a current signal of a predetermined level into the current bus while that transceiver is active (i.e. placing data onto the data bus). The level of current on the current bus is an indicative of the number of currently active transceivers. If the current on the current bus is substantially below the predetermined current level, this indicates that no transceivers are active and the data communication is in the idle state. If the current is substantially at the predetermined current level, this indicates that one transceiver is active and the data communication system is in the communication state. If the current is substantially above the predetermined current level, this indicates that two or more transceivers are active and the data communication system is in the collision state.

The decision as to which state the data communication system is in (idle, communication or collision) may be made locally inside each transceiver without requiring shared system logic as in prior art systems. The data processing system can thus be easily expanded by providing additional transceivers with local collision state detection and arbitration, and connections to the data bus and the current bus.

A more detailed understanding of the invention may be had from the following description of the preferred embodiments, given by way of example, to be read in conjunction with the accompanying drawings, wherein

DETAILED DESCRIPTION

Figure 2:
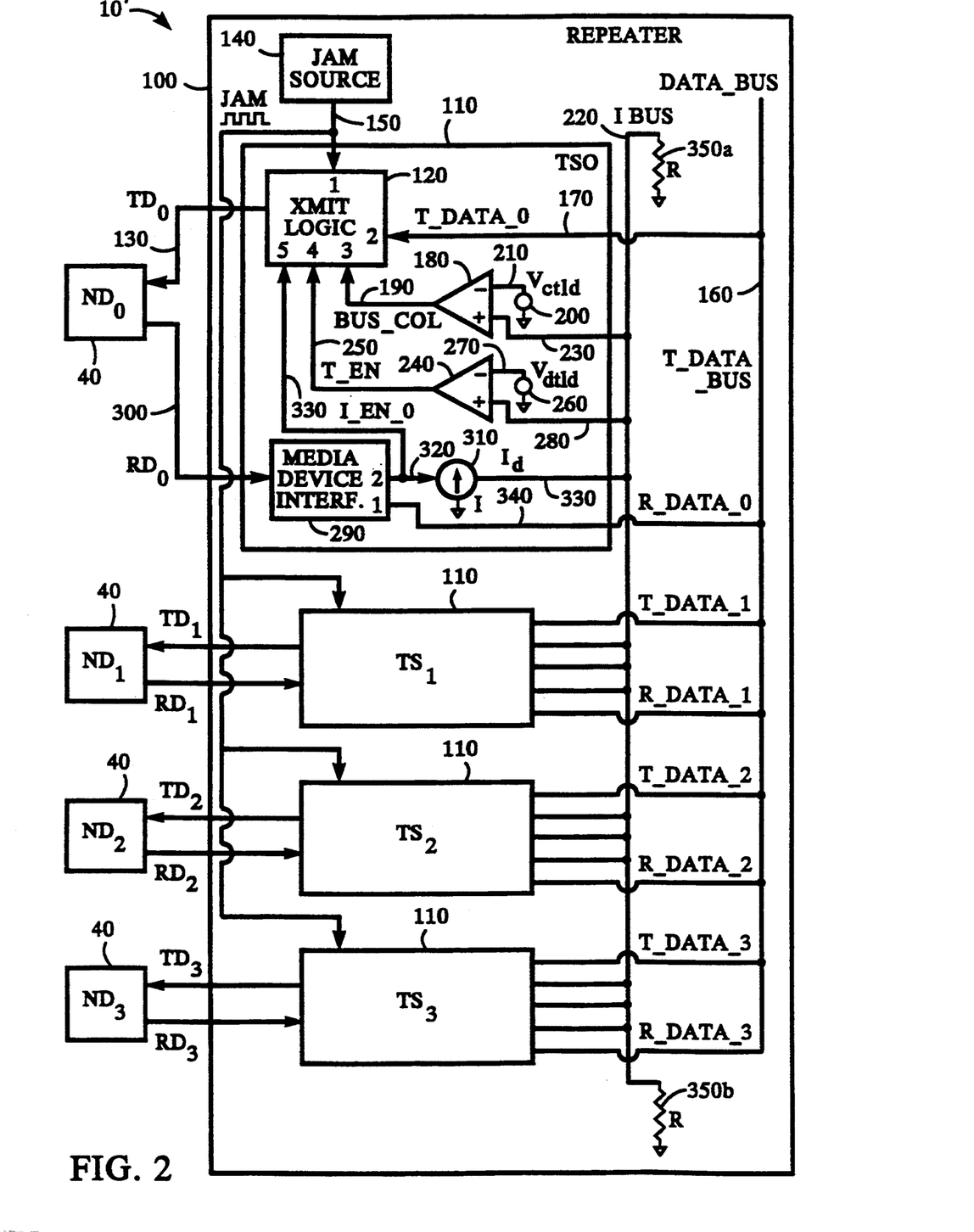
FIG. 2 is a diagram, partially in block form, and partially in schematic form, illustrating a data communication system with a local network interface in accordance with the invention.

FIG. 2 shows a local network segment 10' which includes, by way of example, four nodes 40 (denoted ND0 through ND3) and a repeater 100. Repeater 100 contains four transceivers 110 (denoted as TS0 through TS3), each transceiver 110 being associated with a respective one of the nodes 40. The detailed construction of only transceiver TS0 is shown in FIG. 2. It will be understood that the transceivers TS1 through TS3 are identical to the transceiver TS0.

A data sent signal T_DATA_0 from a data bus 160, located inside repeater 100 external to transceiver 110, is coupled to a first input terminal of a data transmit logic 120 via line 170. An output terminal of data transmit logic 120 is coupled to an input terminal of node ND0 via line 130. An output terminal of a jam signal source 140 is coupled to a second input terminal of data transmit logic 120 via line 150. An output terminal of a bus collision detector 180, located inside transceiver 110, is coupled to a third input terminal of data transmit block 120 via line 190. An output terminal of a collision threshold voltage source 200 is coupled to a first input terminal of bus collision detector 180 via line 210. The second input terminal of bus collision detector 180 is coupled to a current bus 220 via line 230. An output terminal of a data bus threshold detector 240 is coupled to a fourth input terminal of data transmit logic 120 via line 250. An output terminal of a data threshold voltage source 260 is coupled to a first input terminal of data bus threshold detector 240 via line 270. The second input terminal of data bus threshold detector is coupled to current bus 220 via line 280. Data transmit logic 120 may be constructed using a standard programmable array and transceiver logic which is programmed in a straightforward manner to perform all of its functions and is, therefore, not described further.

An output terminal of node ND0 is coupled to an input terminal of a media device interface 290, contained inside transceiver 110, via line 300. A first output terminal of media device interface 290 is coupled to data bus 160 via line 340 and carries a data received signal R_DATA_0. A second output terminal of media device interface 290 is coupled to an input terminal of a controlled current source 310 via line 320 and to a fifth input terminal of data transmit logic 120 via line 330. An output terminal of controlled current source 310 is coupled to current bus 220 via line 330 and carries current signal Id.

Each terminal end of current bus 220 is coupled to one terminal of a first resistor 350a and a second resistor 350b, respectively. The respective second terminals of resistors 350a and 350b are coupled to ground. The resistors 350a and 350b along with current bus 220, thus, form a parallel connection having a predetermined resistance value. For example, if the values of the resistors 350a, and 350b are equal to R, the parallel connection resistance is R/2. Lines 130, 170, 300, and 340 in FIG. 2 may represent one or more physical connections, such as separate cables for data transmission and reception and data enabled status signals.

In operation, local network segment 10' may function in either a communication state or a collision state. When local network segment 10' is in the communication state, only one node 40 is transmitting data to its associated transceiver 110. For example, the node ND0 may deliver a data packet in the form of a binary data received sequence RD0 to media device interface 290 inside the transceiver TS0 via line 300. A logic level current source enable signal (I_EN_0) which appears on line 320 at the first output terminal of media device interface 290, undergoes a transition, for example to logic level 1. This transition enables controlled current source 310 which, in response, outputs a constant current signal $I_d$ onto current bus 220 via line 330. The resultant current bus voltage $V_{ab}$ on current bus 220, thus, becomes $$V_{cb} = I_d \frac{R}{2} = V_{com} \tag{5}$$

where R is the value of the resistors 350a, b, and $V_{com}$ is the voltage on the current bus 220 associated with the communication state. At the same time, media device interface 290 outputs a data received voltage signal R_DATA_0, representing the received data, onto data bus 160 via line 340. Media device interface 290 may be made with standard logic components in a known arrangement to perform all of its functions and is not described further.

The data received voltage signal R_DATA_0 appears on data bus 160 as a transmitted data signal T_DATA_BUS. The transceivers TS1 through TS3, which are coupled to data bus 160 via lines corresponding to line 170, detect the transmitted data signal T_DATA_BUS communicated by the transceiver TS0 to data bus 160 as data transmitted voltage signals T_DATA_i through T_DATA_3 at the respective first input terminals of data transmit logic 120 inside each transceiver TS1 through TS3. Data transmit logic 120 also receives a transmission enable signal (T_EN) generated as the output of data bus threshold detector 240 on line 250. The transmission enable signal T_EN undergoes a transition, for example to logic level 1, whenever the current bus voltage at the second input terminal of data bus threshold detector 240 exceeds the data threshold voltage $V_{dtld}$ at its first input terminal. The data threshold voltage $V_{dtld}$ is selected in such a manner that it is exceeded whenever at least one transceiver 110 is receiving a data packet from its respective node 40 and communicating it to data bus 160.

In addition, data transmit logic 120 receives a bus collision signal (BUS_COL) from the output terminal of bus collision detector 180. The bus collision signal BUS_COL transitions, for example, to logic level 1 whenever the collision threshold voltage $V_{ctld}$ at the first input terminal of bus collision detector 180 is exceeded by the current bus voltage $V_{cb}$. The collision threshold voltage $V_{ctld}$ is selected such that it is exceeded if two or more transceivers 110 are receiving data packets from their respective nodes 40 and communicating them to data bus 160, at the same time. In this situation the controlled current sources 310 of each receiving transceiver 110 are enabled and the current bus voltage $V_{cb}$ is an integer multiple of $$I\frac{R}{2}.$$

For example, if two transceivers 110 are receiving data packets simultaneously, the two associated controlled current sources 310 are enabled and the current bus voltage is $$V_{cb} = 2\left(I\frac{R}{2}\right) = 2V_{com} = V_{col} \tag{6}$$

where $V_{col}$ is a collision state voltage.

The details of the selection of the collision threshold voltage $V_{ctld}$ and the data threshold voltage $V_{dtld}$ are described below in greater detail.

If only transceiver TS0 is receiving data from ND0, the bus collision signal BUS_COL is at logic level 0 and the transmission enable signal T_EN is at logic level 1. Data transmit logic 120 of each transceiver TS1 through TS3 responds to the data transmitted voltage signal T_DATA_1 through T_DATA_3 at its first input terminal by converting the signal into data transmitted sequences TD0 through TD3 which are transmitted to the input terminals of the nodes ND1 through ND3, respectively, via lines 130. Repeater 100 thus ensures that the data packet communicated from the node ND0 is repeated to each other node ND1 through ND3 in local network segment 10'. Repeater 100, thus, acts in accordance with a general communication rule to repeat any data packet received by one transceiver 40 to every other transceiver 40. The task of interpreting the contents of the data packet is left to each receiving node ND1 through ND3. In particular, the destination address of the data packet is compared in each node ND1 through ND3 against its own unique address to determine whether the data packet is addressed to it and should be processed further in accordance with the selected protocol.

Figures 3, 4:
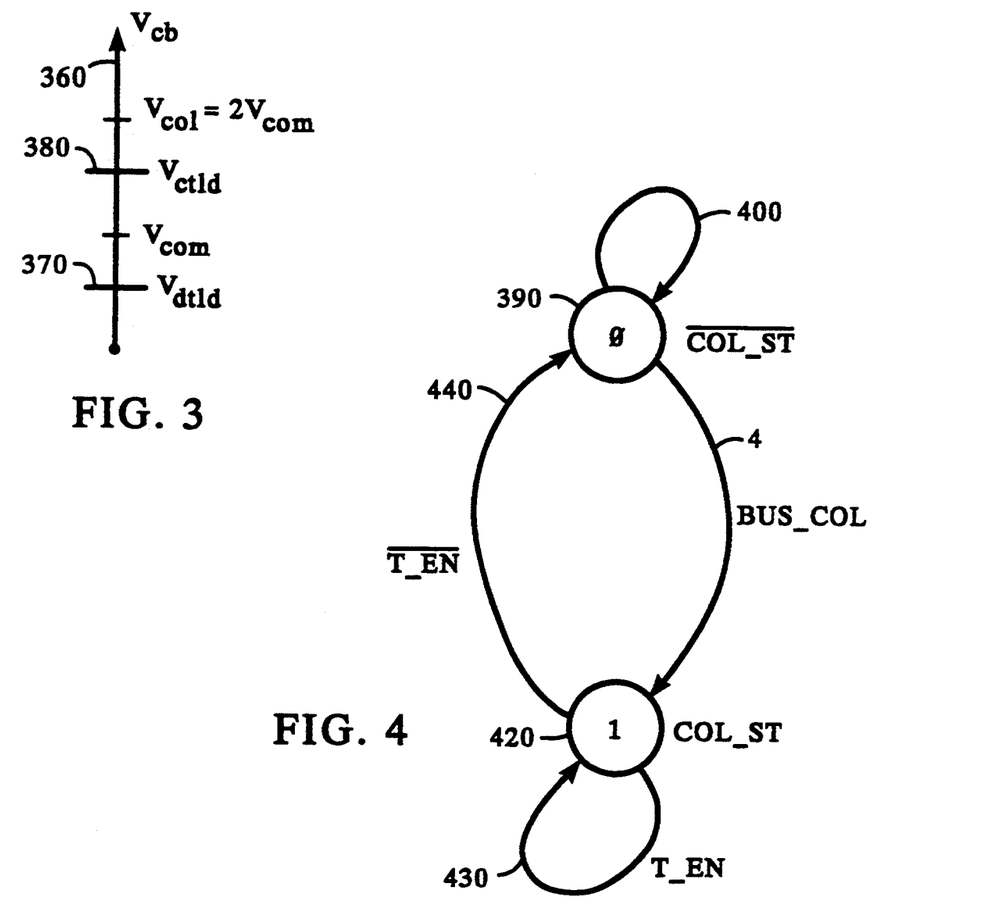
FIG. 3 is a voltage level diagram illustrating the selection of the data threshold voltage and the collision threshold voltage in FIG. 2.
FIG. 4 is a state diagram illustrating the operation of the transceivers in FIG. 2.

FIG. 3 depicts a voltage level diagram with the vertical axis 360 representing the current bus voltage $V_{cb}$. When no nodes 40 are transmitting, no transceivers 100 receive data packets. In this state, none of the controlled current sources 310 are enabled, no current is supplied to the current bus 220 and the current bus voltage level is zero. In the communication state, the communication state current bus voltage $V_{com}$ is determined by the magnitude of the constant current signal $I_d$ supplied by controlled current source 310 of the sole receiving transceiver 110 to current bus 220, and the values of the parallel resistors 350a and 350b (see Equation 5 above). The data threshold voltage $V_{dtld}$, denoted by a horizontal line 370, may be selected to lie between zero and the communication state current bus voltage $V_{com}$, for example:

$$V_{dtld} = 0.5 V_{com} \tag{7}$$

If two transceivers 100 are receiving data packets, the two enabled controlled current sources 310 generate the collision state voltage $V_{col} = 2 V_{com}$. Hence, the collision threshold voltage $V_{ctld}$, denoted by a horizontal line 380, may be selected anywhere between the communication state voltage $V_{com}$ and the collision state voltage $V_{col}$, for example:

$$V_{ctld} = 1.5 V_{com} \tag{8}$$

If more than two transceivers 110 are receiving data packets simultaneously, the current bus voltage $V_{cb}$ will exceed the collision threshold voltage $V_{ctld}$. Thus, the collision state in which two or more transceivers 110 are receiving data packets from their respective nodes 40 at the same time, is detected when the current bus voltage $V_{cb}$ on current bus 220 rises above the collision threshold voltage $V_{ctld}$.

Referring again to FIG. 2, if two or more nodes 40 attempt to transmit a data packet to data bus 160 simultaneously, repeater 100, in attempting to comply with the general communication rule requiring that the data packets received by one transceiver 110 be repeated to every other transceiver, will enter the collision state and will initiate a collision resolution procedure having two phases. The first phase in the collision resolution procedure is known as the multiple node collision phase. In the multiple node collision phase the current bus voltage $V_{cb}$ on current bus 220 equals or exceeds the collision state voltage $V_{col}$ which exceeds the collision threshold voltage $V_{ctld}$. This produces a bus collision signal BUS_COL at the output terminal of bus collision detector 180 of each transceiver 110 having a logic level 1.

The transition of the bus collision signal BUS_COL is detected at the third input terminal of data transmit logic 120, inside each transceiver 110. Transceivers 110 then respond by transmitting a high frequency jam signal JAM generated by jam source 140, and supplied to the second input terminal of data transmit logic 120, to the associated node 40 in the form of a jam sequence (JS) via line 130.

Once the transmitting nodes 40 involved in the collision receive the jam sequence JS, they respond with a node jam sequence (NJS) of a predetermined duration. The node jam signal NJS, in turn, is received by media device interface 290 inside the respective transceiver 110 via line 300. The current source enable signal, for example I_EN_0, at the second output terminal of media device interface 290 undergoes a transition to logic level 0 indicating that the respective node ND0 is not transmitting valid data. While the collision exists, each transceiver 110 continues to transmit the jam sequence JS to its node 40 and the signals present on data bus 160 are ignored.

When only one transceiver 110 continues to receive the node jam sequence NJS from its node 40, local network segment 10' enters into the second and final part of the collision resolution procedure known as the single node collision phase. The current bus voltage $V_{cb}$ falls below the collision threshold voltage $V_{ctld}$ but remains above the data threshold voltage $V_{dtld}$. Consequently, the bus collision signal BUS_COL at the output of bus collision detector 180 of each transceiver 110 undergoes a transition to logic level 0. At the same time, the transmission enable signal T_EN at the output of data bus threshold detector 240 remains at logic level 1. In accordance with the general communication rule, during the single node collision phase of the collision state only the transceivers 110 not receiving data from their respective nodes transmit the jam sequence JS to their nodes 40.

A transition from the single node collision phase of the collision state back to the communication state occurs when the last receiving transceiver 110 no longer receives the data received sequence from its node 40.

FIG. 4 is a state diagram depicting the communication state and the collision state operations of local network segment 10' in FIG. 2 and the transitions between the two states. The state diagram of FIG. 4 represents a one bit state machine that is realized inside each transceiver 110 of FIG. 2. The output of the state machine is a collision state signal (denoted COL_ST). In FIG. 4, the communication state, delineated by circle 390 and corresponding to the collision state signal COL_ST logic level of 0, exists as long as no two nodes 40 (FIG. 2) transmit data packets simultaneously as shown by the loop arrow 400, i.e.

$$\overline{(I\_EN\_K \text{ AND } I\_EN\_L)}, \text{ FOR ALL } K \neq L \tag{9}$$

While Equation (9) holds, the current bus voltage $V_{cb}$ is either zero or equal to the communication voltage $V_{com}$. In either event, the current bus voltage $V_{cb}$ does not exceed the collision threshold voltage $V_{ctld}$ and the bus collision signal BUS_COL at the output of bus collision detectors 180 (FIG. 2) is logic level 0.

If two or more nodes 40 (FIG. 2) transmit data packets, the condition of Equation (9) is violated, i.e.

$$I\_EN\_K \text{ AND } I\_EN\_L, \text{ FOR SOME } K \neq L \quad (10)$$

and a transition (indicated by an arrow 410) to a collision state, delineated by a circle 420 and corresponding to the logic level 1 of the collision state signal COL_ST occurs. As discussed in connection with FIG. 2, in this state the bus collision signal BUS_COL transitions to logic level 1. Thereafter, the collision state 420 will persist as long as at least one node 40 (FIG. 2) continues to transmit, as shown by a loop arrow 430, i.e.

$$I\_EN\_K, \text{ FOR AT LEAST ONE } K \quad (11)$$

Once all the nodes 40 (FIG. 2) stop transmitting the collision state signal COL_ST returns to logic level 0, a transition, denoted by an arrow 440, is made back to the communication state 390. This transition thus occurs whenever $$\overline{I\_EN\_K}, \text{ FOR ALL } K \quad (12)$$

The corresponding logical equations governing the communication state and the collision state operation of transceivers 110 are $$TD0 = \quad (13)$$
$[\overline{COL\_ST} \text{ AND } \overline{I\_EN\_0} \text{ AND } T\_EN \text{ AND } T\_DATA\_0]$
OR $[COL\_ST \text{ AND } \overline{BUS\_COL} \text{ AND } JAM]$
OR $[COL\_ST \text{ AND } BUS\_COL \text{ AND } \overline{I\_EN\_0} \text{ AND } JAM]$ $$TD1 = \quad (14)$$
$[\overline{COL\_ST} \text{ AND } \overline{I\_EN\_1} \text{ AND } T\_EN \text{ AND } T\_DATA\_1]$
OR $[COL\_ST \text{ AND } \overline{BUS\_COL} \text{ AND } JAM]$
OR $[COL\_ST \text{ AND } BUS\_COL \text{ AND } \overline{I\_EN\_1} \text{ AND } JAM]$
...

and so forth for nodes ND2 and ND3.

The logic decision regarding data transmission to each node 40 (FIG. 2) is thus made entirely locally inside its associated transceiver 110 without resorting to a shared logic block 70 which was necessary for the prior art local network segment 10 shown in FIG. 1. Because the state of local network segment 10' is completely determined by the current bus voltage $V_{ob}$, each transceiver 110 requires only access to current bus 220 (FIG. 2) to evaluate its corresponding Equation (14). Therefore, repeater 100 may be easily expanded by simply providing additional transceivers 110 with the identical connections to current bus 220 and data bus 160.

Figure 5:
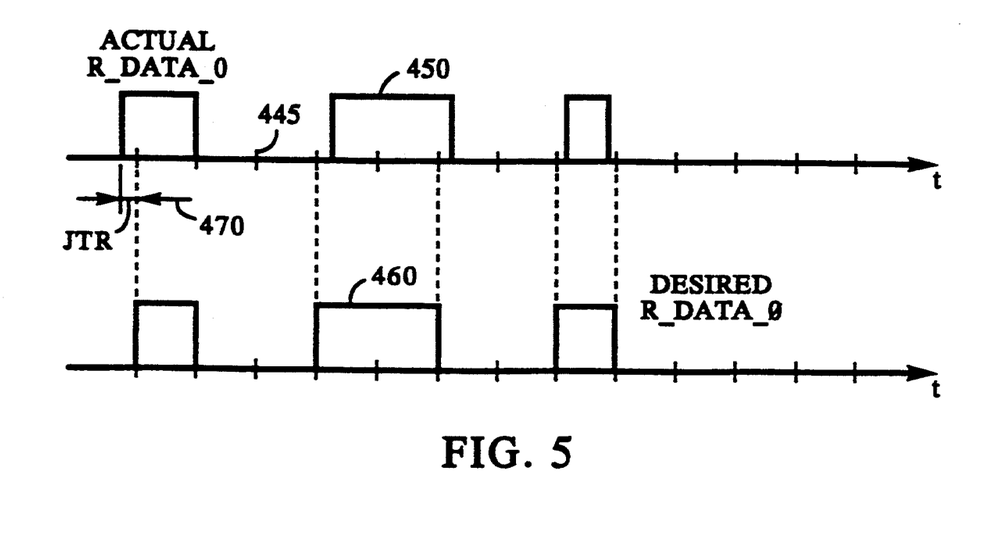
FIG. 5 is a waveform diagram illustrating an actual and desired data received voltage signals.

Transmission of the data received voltage signals R_DATA_0 through R_DATA_3 from transceivers 110 to data bus 160 over lines 340 may result in significant phase distortion of the signals. FIG. 5 depicts, by way of example, two waveform diagrams. The upper waveform is an actual waveform 450 of the data received voltage signal R_DATA_0, while the lower waveform is a desired waveform 460 of the signal. Ideally, logical level transitions of the data received voltage signal R_DATA_0 should occur only at discrete time intervals defined by a data clock (not shown) and denoted by vertical ticks 445 in FIG. 5. However, actual waveform 450 of the data received voltage signal R_DATA_0 may exhibit transitions which do not coincide with the data clock pulses. The phase shift between the actual waveform 450 and the desired waveform 460 of the data received voltage signal R_DATA_0 is known as the signal jitter (denoted as JTR) which is indicated by a double arrow line 470. To reduce the error rate associated with data transmission, the data received voltage signal R_DATA_0 must be adjusted to acquire the desired waveform shape 460 by bringing the logical level transitions into phase alignment with the data clock pulses.

Figure 6:
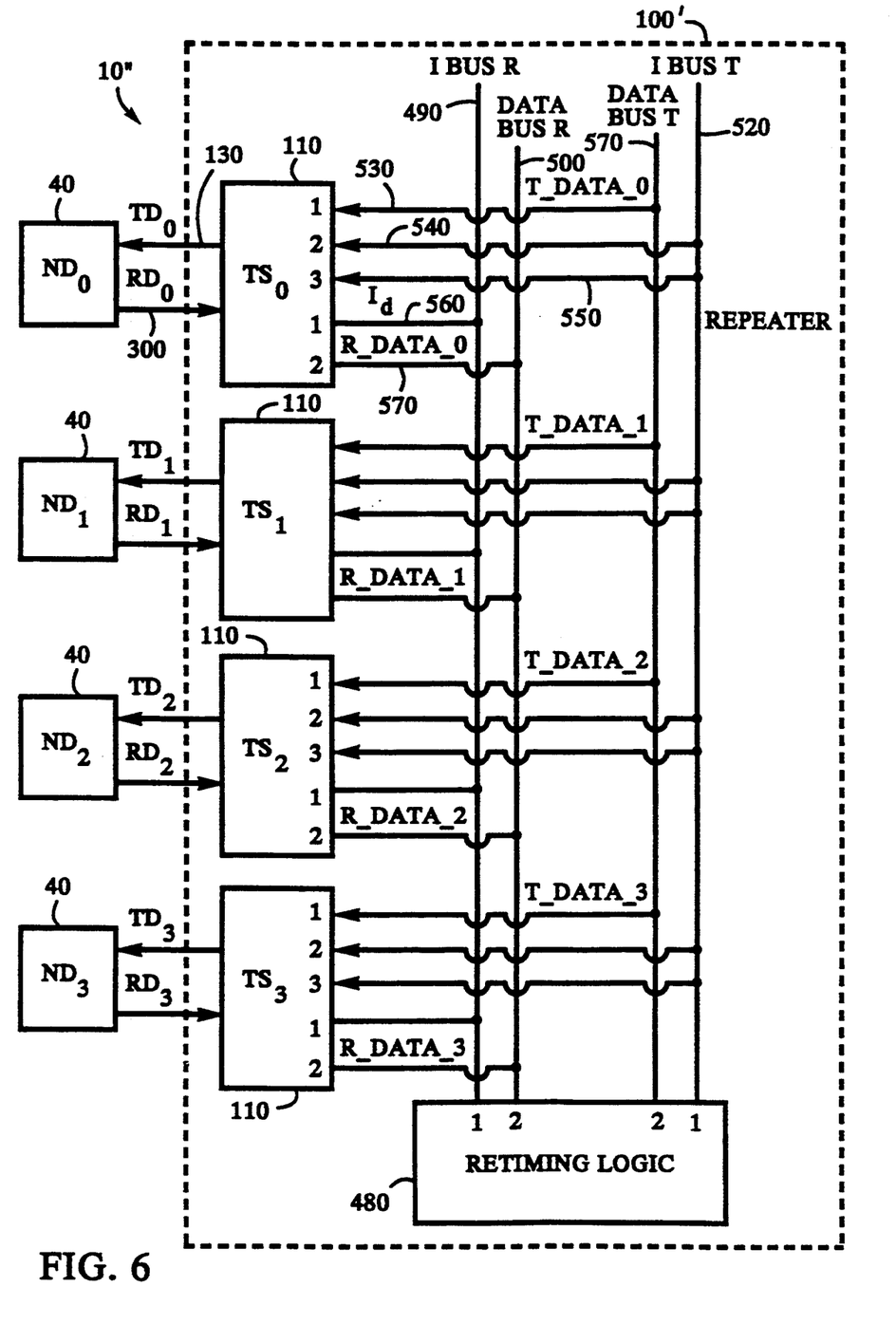
FIG. 6 is a block diagram illustrating the data communication system with a local network interface in accordance with a modified embodiment of the invention.

FIG. 6 depicts a local network interface 10" including repeater 100' in accordance with a modified embodiment of the invention in which elements similar to those illustrated in FIG. 2 are denoted with similar reference numerals, and are not described in detail below. Repeater 100' is provided with a retiming logic 480. A reception current bus 490 (denoted as I BUS R) is coupled to a first input terminal of retiming logic 480. A reception data bus 500 (denoted as DATA BUS R) is coupled to a second input terminal of retiming logic 480. A first output terminal of retiming logic 480 is in turn coupled to a transmission current bus 520 (denoted as I BUS T), while a second output terminal of retiming logic 480 is coupled to a transmission data bus 510 (denoted as DATA BUS T). A first input terminal of each transceiver 110, such as TS0, receives the data sent voltage signal T_DATA_0 via line 530 from transmission data bus 510. Second and third input terminals of each transceiver 110 (corresponding to lines 230 and 280, respectively, illustrated in FIG. 2) are coupled to transmission current bus 520 via lines 540 and 550, respectively. A first output terminal of transceiver 110 is coupled to reception current bus 490 via line 560 and carries signal $I_d$. A second output terminal of transceiver 110 is coupled to reception data bus via line 570 and carries signal R_DATA_0.

The operation of each transceiver 110 is similar to that described in connection with FIG. 2. However, the splitting of the current bus 170 and the data bus 160 (FIG. 2) into the reception and transmission current and data buses, respectively, coupled via retiming logic 480 allows the data received voltage signal to be retimed, as described below. The retiming procedure adjusts the phase of the logical level transitions in the data received voltage signals R_DATA_0 through R_DATA_3 so that they occur in synchronism with a clock signal. Before they are repeated to the transmission data bus, the signals thus acquire the desired waveform shape 460 (FIG. 5). This retiming leads to significant reduction in the transmission error rates.

Figure 7:
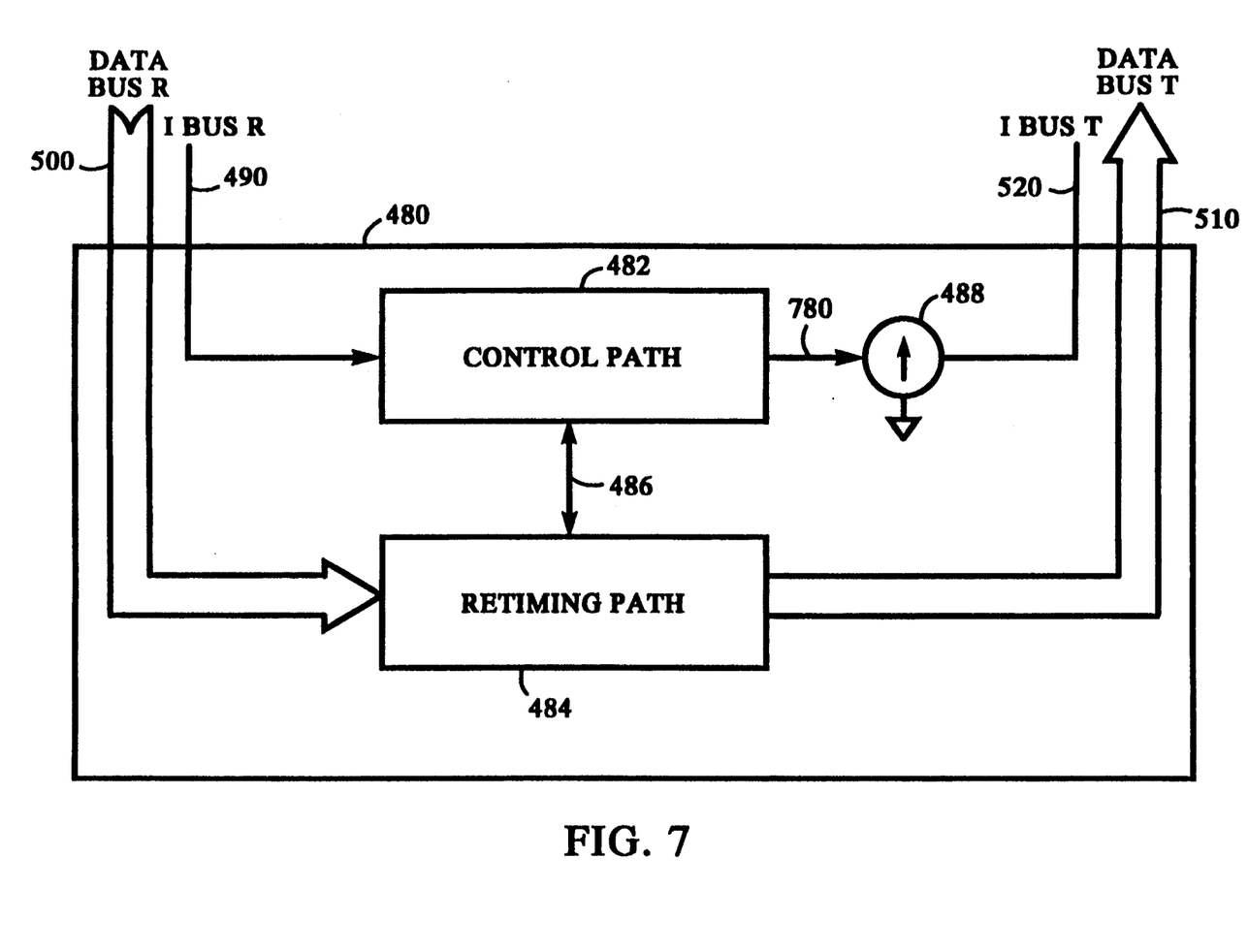
FIG. 7 is a block diagram illustrating the retiming logic shown in FIG. 6.

FIG. 7 illustrates a block diagram of the main functional elements of retiming logic 480 shown in FIG. 6. Reception current bus I BUS R 490 is coupled to an input terminal of a control path 482. An output terminal of control path 482 is coupled to an input terminal of a controlled current source 488 via line 780. An output terminal of controlled current source 488 is coupled to transmission current I BUS T bus 520. Reception data bus 500 is coupled to an input terminal of a retiming path 484. An output terminal of retiming path 484 is coupled to transmission data bus 510. Control path 482 and retiming path 484 are interconnected via a control line 486.

In operation, control path 482 responds to a voltage signal on reception current bus I BUS R 490 to generate a current control signal controlling controlled current source 488 as described in greater detail below. Retiming path 484 responds to a data received voltage signal, such as R_DATA_0, at its input, to produce a retimed transmitted data signal T_DATA_BUS which is communicated to transmission data bus DATA BUS T 510 under control of control path 486, as described in greater detail below.

Figure 8:
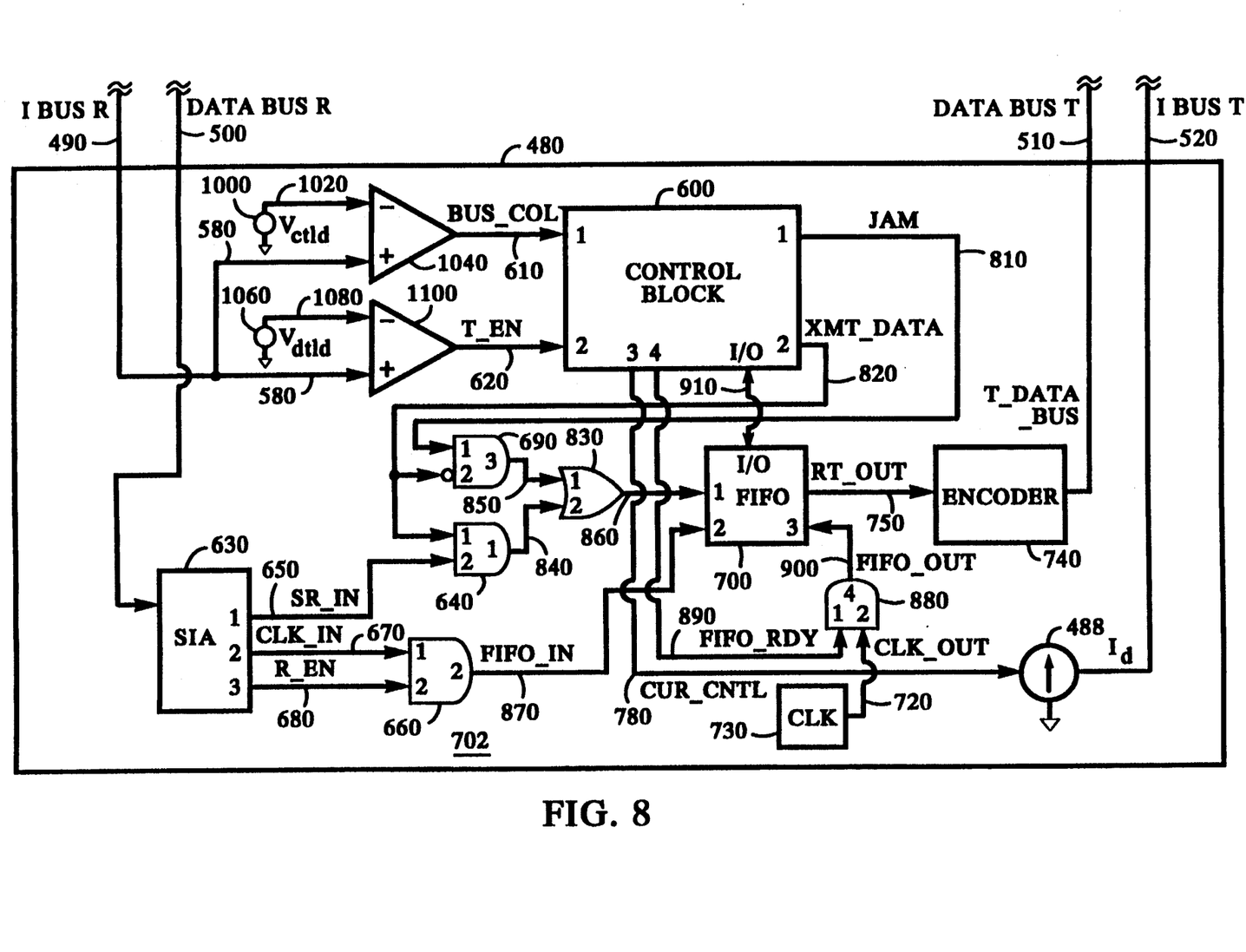
FIG. 8 is a more detailed diagram, partially in block form, and partially in schematic form, illustrating the detailed construction of the retiming logic shown in FIG. 7.

FIG. 8 depicts the detailed construction of the retiming logic 480 of FIG. 7. An output terminal of a collision threshold voltage source 1000 is coupled to a first input terminal of a bus collision detector 1040 via line 1020. An output terminal of a data threshold voltage source 1060 is coupled to a first input terminal of a data bus threshold detector 1100 via line 1080. The second input terminals of bus collision detector 1040 and data bus threshold detector 1100 are coupled to reception current bus 490 via lines 580 and 590, respectively. The output terminal of bus collision detector 1040 is coupled to a first input terminal of a control block 600 via line 610. The output terminal of data bus threshold detector 1100 is coupled to a second input terminal of control block 600 via line 620. In combination, bus collision detector 1040, data bus threshold detector 1100, and control block 600 form control path 482 in FIG. 7.

Reception data bus DATA BUS R 500 is coupled to an input terminal of a serial interface adaptor 630 (denoted as SIA). A first output terminal of SIA 630 is coupled to a first input terminal of a first AND gate 640 via line 650. A second output terminal of SIA 630 is coupled to a first input terminal of a second AND gate 660 via line 670. A third output terminal of SIA 630 is coupled to a second input terminal of second AND gate 660 via line 680. A first output terminal of control block 600, producing a JAM signal, is coupled to a first input terminal of a third AND gate 690 via line 810. A second output terminal of control block 600 is coupled to a second, inverting, input terminal of third AND gate 690 and a second input terminal of first AND gate 640 via line 820. An output terminal of first AND gate 640 is coupled to a first input terminal of an OR gate 830 via line 840. An output terminal of third AND gate 690 is coupled to a second input terminal of OR gate 830 via line 850. An output terminal of OR gate 830 is coupled to a first input terminal of a FIFO 700 via line 860. The output terminal of second AND gate 660 is coupled to a second input terminal of FIFO 700 via line 870. Gates 640, 660, 690, and 830 in combination with FIFO 700 form a retiming block 702.

A third output terminal of control block 600 is coupled to the input terminal of a controlled current source 488 via line 780. A fourth output terminal of control block 600 is coupled to a first input terminal of a fourth AND gate 880 via line 890. The output terminal of an internal clock signal generator 730 (denoted as CLK) is coupled to a second input terminal of fourth AND gate 880 via line 720. An output terminal of fourth AND gate 880 is coupled to a third input terminal of FIFO 700 via line 900. An input/output terminal of control block 600 is coupled to an input/output terminal of FIFO 700 via line 910. An output terminal of FIFO 700 is coupled to an input terminal of an encoder 740 via line 750. An output terminal of encoder 740 is coupled to transmission data bus 510. An output terminal of controlled current source 488 is coupled to transmission current bus I BUS T 520. SIA 630, retiming block 702, encoder 740, internal clock 730, and fourth AND gate 880 in combination form retiming path 484 shown in FIG. 7.

In FIG. 8, the control block 600 may be implemented as a PAL which is programmed in a straightforward manner to perform all of its required functions and is not described in further detail. The SIA 630 and encoder 740 may likewise be constructed from components known to those skilled in the art and are not described further.

In operation, SIA 630 receives at its input terminal a data received voltage signal, for example R_DATA_0, from reception data bus DATA BUS R 500. SIA 630 converts the encoded signal R_DATA_0 (for example Manchester encoded) into a logic level serial data input signal SR_IN, for example in the form of a Non-Return TO Zero (NRZ) TTL signal. Serial data input signal SR_IN is supplied to the first input terminal of first AND gate 640. An SIA phase locked loop (not shown) inside SIA 630 generates an input, synchronized to the encoded signal R_DATA_0, clock signal CLOCK_IN at the second output terminal of SIA 630. The input clock signal CLOCK_IN is supplied to the first input terminal of second AND gate 660. The frequency of the input clock signal CLOCK_IN corresponds in phase and frequency to the data received voltage signal R_DATA_0, which is used as the reference to the SIA phase locked loop. A read enable signal R_EN at the third output terminal of SIA 630 is supplied to the second input terminal of second AND gate 660. The read enable signal R_EN is a logic level signal which is at logic level 0 when no transceivers 110 (FIG. 6) are transmitting the data received voltage signals, R_DATA_0 through R_DATA_3, to reception data bus DATA BUS R 500. Once a data received voltage signal representing a data packet, for example R_DATA_0, appears on reception data bus DATA BUS R 500, the read enable signal R_EN undergoes a transition to logical level 1 and remains at logic level 1 throughout the transmission of the entire data packet from reception data bus DATA BUS R 500 to SIA 630. As a result, the FIFO input signal FIFO_IN supplied to the second input terminal of FIFO 700 remains at logic level 0 if no data is transmitted via reception data bus DATA BUS R 500 and becomes a periodic logic level signal, whose frequency corresponds to the frequency of the data received voltage signal R_DATA_0, during the data transmission.

If the local network segment 10'' (FIG. 6) is functioning in the communication state, BUS_COL signal at the first input terminal of control block 600 is at logic level 0. If no data is transmitted to reception data bus DATA BUS R 500, the voltage on reception current bus 490 is below the data threshold voltage $V_{dtld}$ generated by data threshold voltage source 1060. Data threshold voltage source 1060 and data bus threshold detector 1100 operate in a manner similar to data threshold voltage source 260 and data bus threshold detector 240 of FIG. 2, respectively, and are not described in greater detail. The transmission enable signal T_EN at the output terminal of data bus threshold detector 1100 is, thus, at logic level 0. Control block 600 responds by suppressing the jam signal JAM at its first output terminal and generating the transmit data signal XMT_DATA as a logic level 1.

If a single transceiver is communicating data to reception data bus DATA BUS R 500, the voltage on reception current bus I BUS R 490 is $V_{com}$, as described above. The communication state voltage $V_{com}$ is detected at the second input terminal of data bus threshold detector 1100 which responds by generating the transmission enable signal T_EN having logic level 1, which is supplied to the second input terminal of control block 600. Control block 600 responds by generating the high frequency jam signal JAM (described above) at its first output terminal, while a data transmit signal XMT_DATA at its second output terminal undergoes a transition to logic level 1. Because the data transmit signal XMT_DATA is inverted and supplied to the second input terminal of third AND gate 690 (as indicated by the bubble at the second input terminal of third AND gate 690), the output of third AND gate 690 is at logic level 0. At the same time, the output of first AND gate is enabled to pass the serial data input signal SR_IN. The serial data input signal SR_IN is then passed through OR gate 830 and supplied to the first input terminal of FIFO 700. FIFO input signal FIFO_IN is used as a clock signal to synchronize the storage of data bits represented by the serial data input signal SR_IN inside FIFO 700.

Control block 600 obtains information regarding the status of FIFO 700, such as FIFO capacity utilization and overflow, by communicating a status request signal to FIFO 700 and receiving a status report signal therefrom, via line 910. The FIFO 700 may contain a fixed number of bits, for example 12 bits. Once FIFO 700 is filled to a predetermined portion of its full capacity, for example after FIFO has three bits stored in it, control block 600 generates a transition to logic level 1 in a FIFO ready signal FIFO_RDY. The FIFO ready signal FIFO_RDY is supplied to the first input terminal of fourth AND gate 880 via line 890. Fourth AND gate 880 is thus enabled to pass an output clock signal CLK_OUT of predetermined frequency generated by internal clock 730 to produce a FIFO output signal FIFO_OUT at the third input terminal of FIFO 700. The FIFO output signal FIFO_OUT is used to synchronize the output of a retimed output signal RT_OUT from FIFO 700. The logic level retimed output signal RT_OUT is supplied as the input to encoder 740 where it is converted into a Manchester encoded transmitted data signal T_DATA_BUS which is in turn supplied to transmission data bus DATA BUS T 510. Since the transmitted data signal T_DATA_BUS has been retimed inside the retiming logic 480, the signal jitter 470 (FIG. 5) has been eliminated and error rate associated with incorrect data signal decoding has been significantly reduced.

To ensure that the communication state voltage $V_{com}$ appears on transmission current bus I BUS T 520 simultaneously with the retimed transmitted data signal T_DATA_BUS appearing on transmission data bus 510, the current source control signal CUR_CNTL at the third output terminal of control block 600 is supplied to the input terminal of controlled current source 488 at the same time as FIFO 700 is enabled by the FIFO output signal FIFO_OUT. The transition to logic level 1 in the current source control signal CUR_CNTL enables controlled current source 488 which outputs a retimed constant current signal $I_d$ onto transmission current bus I BUS T 520. The retimed transmitted data signal T_DATA_BUS can thus be received by transceivers 110 (FIG. 6) upon detection of the communication state voltage $V_{com}$ on transmission current bus.

The bus collision state occurs whenever two or more transceivers 110 attempt to transmit the data received voltage signals R_DATA_I (I=0,1,2,3) at the same time. As a result, the bus collision signal BUS_COL at the output of bus collision detector 180 inside retiming logic 480 undergoes a transition to logic level 1. This transition is detected at the first input terminal of control block 600. Control block responds by creating a transition in the transmit data signal XMT_DATA at its second output terminal to logic level 0. This enables second AND gate 690 so that the jam signal JAM appearing at the first input terminal of third AND gate 690 is passed through to the second input terminal of OR gate 830. At the same time the first AND gate 640 is disabled so that the serial data input signal SR_IN no longer appears at the first input terminal of OR gate 830. The output terminal of OR gate 830 then produces the jam signal JAM. Gates 640, 690, and 830 thus operate as a multiplexor transmitting the serial data input signal SR_IN to FIFO whenever the transmit data signal XMT_DATA is present (i.e. at logic level 1) and transmitting the jam signal JAM whenever the transmit signal XMT_DATA is absent (i.e. at logic level 0). In a manner analogous to the serial data input signal SR_IN, the bit pattern represented by jam signal JAM is then stored in FIFO 700. The jam signal JAM is retimed and output as a retimed output signal RT_OUT. Analogous to the data signal transmission described above, the retimed output signal RT_OUT is converted to a Manchester encoded voltage signal by encoder 740 and supplied to transmission data bus 510.

The foregoing description of the preferred embodiments is offered solely by way of illustration of the underlying principles of the invention. Many changes, modifications, and variations apparent to those skilled in the art may suggest themselves and are to be taken as embraced within the spirit and the scope of the appended claims.

I claim:

1. The data communication system including a plurality of nodes, comprising:
    data bus means;
    current bus means;
    a plurality of transceivers, each said transceiver coupled to an associated node and to the data bus means and the current bus means, for data communication between the transceiver and the associated node, each transceiver inserting a current signal onto the current bus means when the transceiver is placing data onto the data bus means, and each transceiver having media device interface means coupled to an output terminal of the associated node and responsive to a data received sequence generated by the associated node, the media device interface means having a first output terminal coupled to the data bus means, for transmitting a data received voltage signal thereto, and a second output terminal for generating a current source enable signal when the transceiver is placing the data onto the data bus means, wherein the controlled current source is provided with a control input terminal coupled to a second output terminal of the media device interface means, and is further provided with an output terminal coupled to the current bus means, for generating a current of a predetermined magnitude in response to the current source enable signal;
    first resistor means having one terminal coupled to one terminal end of said current bus means, and having the other terminal coupled to a reference voltage source;

second resistor means having one terminal coupled to the other terminal end of the current bus means, and having the other terminal coupled to the reference voltage source;

a jam source means for generating a jam signal having a predetermined bit pattern;

collision threshold voltage source means for generating a collision threshold voltage of a first predetermined magnitude;

bus collision detector means, having a first input terminal responsive to the collision threshold voltage and a second input terminal coupled to the current bus, for generating a bus collision signal; and data threshold voltage source means for generating a data threshold voltage of a second predetermined magnitude;

data bus threshold detector means, having a first input terminal responsive to the data threshold voltage and a second input terminal coupled to the current bus, for generating a transmission enable signal; and data transmit logic means, having a first input terminal responsive to the jam signal, a second input terminal responsive to a data transmitted voltage signal from the data bus means, a third input terminal responsive to the bus collision signal, a fourth input terminal responsive to the transmission enable signal, a fifth input terminal responsive to the current source enable signal, and an output terminal of the data transmit logic means coupled to an input terminal of the node, for transmitting a data transmitted sequence to the associated node in the absence of the bus collision signal whenever the transmission enable signal is present and for transmitting the jam signal whenever the bus collision signal is present.

2. A data communication system having a plurality of nodes comprising:

a plurality of transceivers, each transceiver coupled to an associated node, for data communication between the transceiver and the associated node;

reception data bus means coupled to each transceiver, for receiving a data signal therefrom;

reception current bus means, coupled to each transceiver, for receiving a current signal therefrom;

transmission data bus means, coupled to each transceiver, for receiving a retimed data signal and communicating the retimed data signal to each transceiver; and transmission current bus means, coupled to each transceiver, for receiving a retimed current signal and communicating the retimed current signal to each transceiver;

retiming logic means, coupled to the reception data bus means and the reception current bus means, and further coupled to the transmission data bus means and the transmission current bus means, for retiming the received data signal, the retiming logic means having a control path, responsive to the current signal through the reception current bus means, for generating a current control signal and a FIFO ready signal, the retiming logic means also having a current source means, responsive to the current control signal, for generating a retimed current signal through the transmission current bus means, the retiming logic means further having a retiming path, coupled between the reception data bus means and the transmission data bus means, for retiming the received data signal and communicating the retimed data signal to the transmission data bus means.

3. The data communication system of claim 2 wherein the control path further comprises:

collision threshold voltage source means for generating a collision threshold voltage;

bus collision detector means, coupled to the reception current bus means and the collision threshold voltage source means, for generating a bus collision signal whenever the voltage on the reception current bus means exceeds the collision threshold voltage;

data threshold voltage source means for generating a data threshold voltage;

data bus threshold detector means, coupled to the reception current bus means and the data threshold voltage source means, for generating a transmission enable signal whenever the voltage across the reception current bus means exceeds the data threshold voltage; and control block means responsive to the bus collision signal and the transmission enable signal for generating a jam signal, a transmit data signal, and the FIFO ready signal, and controlling the retiming path.

4. The data communication system of claim 2 wherein the retiming path further comprises serial interface adaptor means, responsive to the received data signal, for generating a serial data input signal;

clock means for generating an output clock signal;

retiming block means responsive to the serial data input signal, the output clock signal, and control signals communicated by the control path for generating a retimed output signal; and encoder means responsive to the retimed output signal for generating a transmitted data signal on to the transmission data bus means.

5. The data communication system of claim 4 wherein the retiming block means further comprises:

an input clock generated by the serial interface adaptor means;

a read enable signal generated by the serial interface adaptor means;

first AND gate means, responsive to the input clock signal and the read enable signal, for generating a FIFO input signal whenever both the input clock signal and the read enable signal are present;

multiplexer means, responsive to the jam signal, the transmit data signal, and the FIFO input signal, for selecting the FIFO input signal whenever the transmit data signal is present and selecting the jam signal whenever the transmit data signal is absent;

second AND gate means, responsive to the output clock signal and the FIFO ready signal, for generating a FIFO output signal; and FIFO means, coupled to the multiplexer means, the control block means, and the second AND gate means, for generating a status report signal to the control block means and generating a retimed output signal.

6. A communications system comprising:

a plurality of nodes;

a collision bus;

a plurality of transceivers, each said transceiver associated with one of said plurality of nodes, each said transceiver coupled with said collision bus and said associated node, each said transceiver outputting a predetermined current onto said collision bus when said each said transceiver is receiving a data signal from its associated node, and each said transceiver having COMMUNICATION state (NOT (COL_ST)) and a COLLISION state COL_ST);

a first means, within each said transceiver, for transitioning from said COMMUNICATION state (NOT (COL_ST)) to said COLLISION state (COL_ST) when a voltage level on said collision bus exceeds a high voltage level, said first means having a collision threshold voltage source for generating said high voltage level, and a collision threshold detector, coupled with said collision threshold voltage source and said collision bus, for comparing said high voltage level and the voltage level of said collision bus, and for outputting a bus collision signal (BUS_COL) when the voltage level of said collision bus exceeds said high voltage level;

a second means, within each said transceiver, for transitioning from said COLLISION state (COL_ST) to said COMMUNICATION state (NOT (COL_ST)) when said voltage level on said collision bus is less than a low voltage level; a data bus, coupled with each said transceiver, for carrying a data signal (T_DATA) among said plurality of transceivers; and each said transceiver repeating said data signal from said data bus to said associated node when each said transceiver is in said COMMUNICATION state, and each said transceiver not repeating said data signal (T_DATA) from said data bus to said associated node when said transceiver is in said COLLISION state.

7. The communications system as in claim 6, each said second means further comprising:

a data threshold voltage source for generating said high voltage level;

a data threshold detector, coupled with said data threshold voltage source and said collision bus, for comparing said data threshold voltage source and the voltage level of said collision bus, and for outputting a transmission enable signal (T_EN) when the voltage level of said collision bus exceeds said low voltage level.

8. The communications system as in claim 7, said second means further comprising:

a collision state machine, within each said transceiver, coupled with said data threshold detector and said collision threshold detector, for outputting a collision state signal (COL_ST), said collision state signal (COL_ST) transitioning to TRUE when said collision threshold detector outputs said bus collision signal (BUS_COL), and transitioning to FALSE when said data threshold detector is not outputting said transmission enable signal (T_EN).

9. The communications system as in claim 8, further comprising:

a jam signal source, coupled with each said transceiver, for outputting a jam signal (JAM) to said node associated with said transceiver, when said bus collision signal (BUS_COL) is present;

a media device interface, within each said transceiver, coupled with said associated node, for outputting a data received signal (T_DATA) and a current source enable signal (L_EN) when data is received from said associated node;

a controlled current source means, within each said transceiver, coupled with said media device interface and said collision bus, for outputting said predetermined current onto said current bus when said current source enable signal (L_EN) is received from said media device interface; and a transmit logic, within each said transceiver, coupled with said media device interface, said collision state machine, said collision detector, said data threshold detector, said data bus, said jam source, and said associated node, for outputting a Transmit Data signal TD to said associated node equal the following logic equation TD=[NOT (COL_ST)) and (NOT (L_EN)) and T_EN and T_DATA] or [COL_ST and BUS_COL and JAM] or [COL_ST and (NOT (BUS_COL)) and (NOT (L_EN)) and JAM].

10. The communications system as in claim 6, wherein said high voltage level is equal to 1.5 times a voltage produced in said collision bus by one of said plurality of transceivers outputting said predetermined current onto said collision bus.

11. The communications system as in claim 6, wherein said low voltage level is equal to one half a voltage produced in said collision bus by one of said plurality of transceivers outputting said predetermined current onto said collision bus.

12. A repeater, comprising:

a collision bus;

a plurality of transceivers, each said transceiver capable of being coupled with an associated node, each said transceiver coupled with said collision bus, each said transceiver capable of outputting a predetermined current onto said collision bus when said each said transceiver is receiving a data signal from its associated node, and each said transceiver having a COMMUNICATION state (NOT (COL_ST)) and a COLLISION state (COL_ST);

a first means, within each said transceiver, for transitioning from said COMMUNICATION state (NOT (COL_ST)) to said COLLISION state (COL_ST) when a voltage level on said collision bus exceeds a high voltage level, said first means having a collision threshold voltage source for generating said high voltage level, and said first means further having a collision threshold detector, coupled with said collision threshold voltage source and said collision bus, for comparing said high voltage level and the voltage level of said collision bus, and for outputting a bus collision signal (BUS_COL) when the voltage level of said collision bus exceeds said high voltage level;

a second means, within each said transceiver, for transitioning from said COLLISION state (COL_ST) to said COMMUNICATION state (NOT (COL_ST)) when said voltage level on said collision bus is less than a low voltage level;

a data bus, coupled with each said transceiver, for carrying a data signal (T_DATA) among said plurality of transceivers; and each said transceiver capable of repeating said data signal from said data bus to said associated node when each said transceiver is in said COMMUNICATION state, and each said transceiver capable of not repeating said data signal (T_DATA) from said data bus to said associated node when said transceiver is in said COLLISION state.

* * * * *